July 13, 1965  R. L. McILVAINE  3,194,543
MIXER
Filed Oct. 31, 1963  2 Sheets-Sheet 1
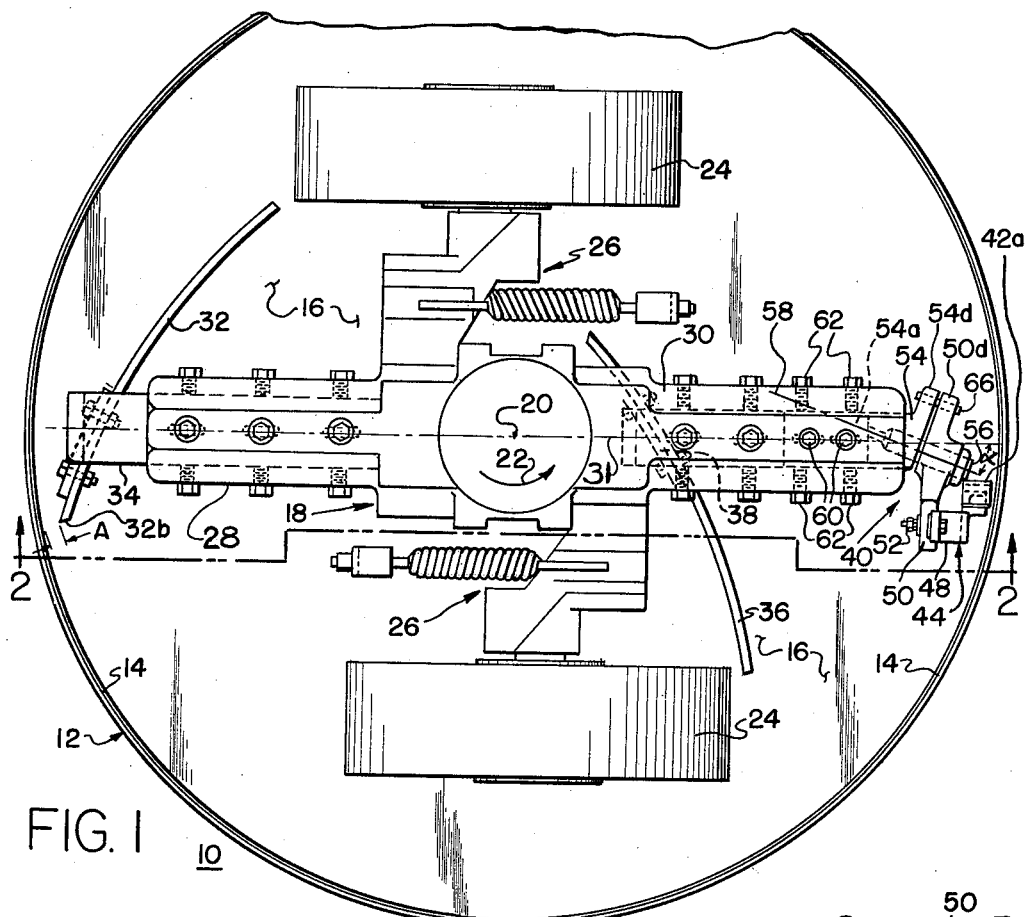
FIG. I
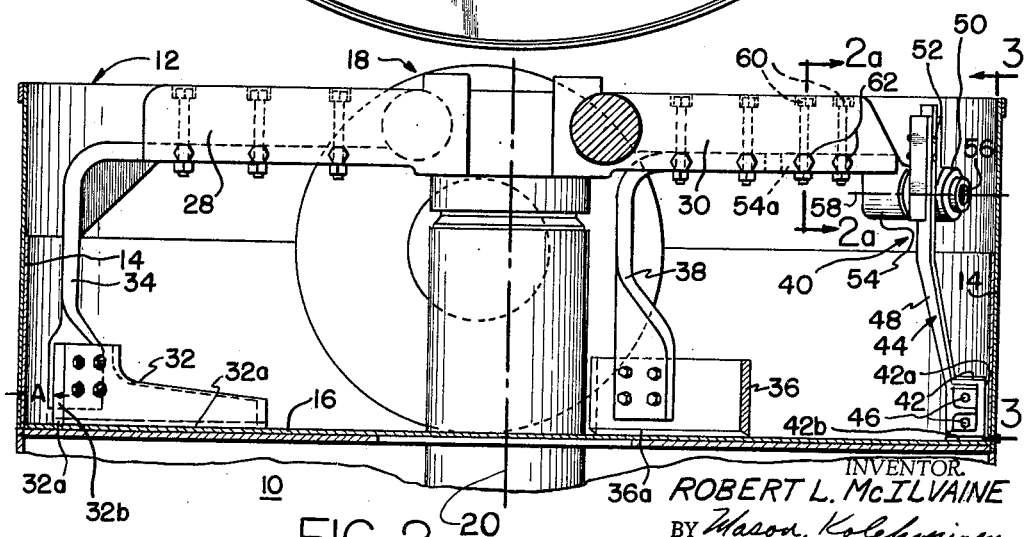
FIG. 2
INVENTOR.
ROBERT L. McILVAINE
BY Mason, Kolehmainen,
Rathburn & Wyss.
ATTORNEYS July 13, 1965 R. L. McILVAINE 3,194,543
MIXER
Filed Oct. 31, 1963 2 Sheets-Sheet 2
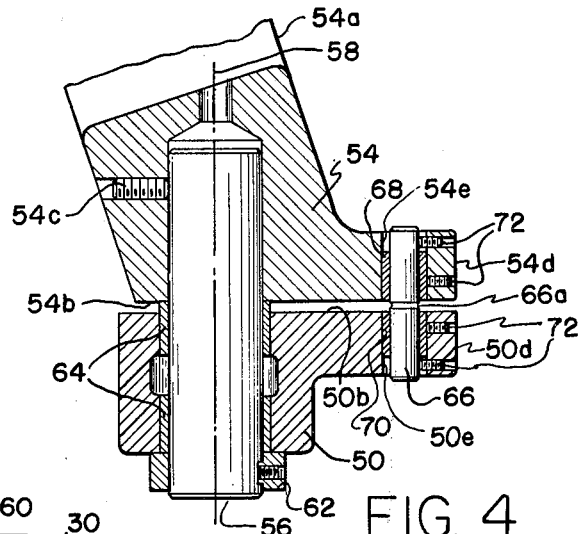
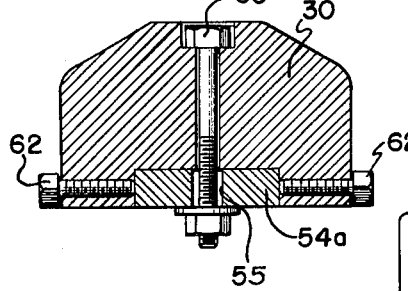
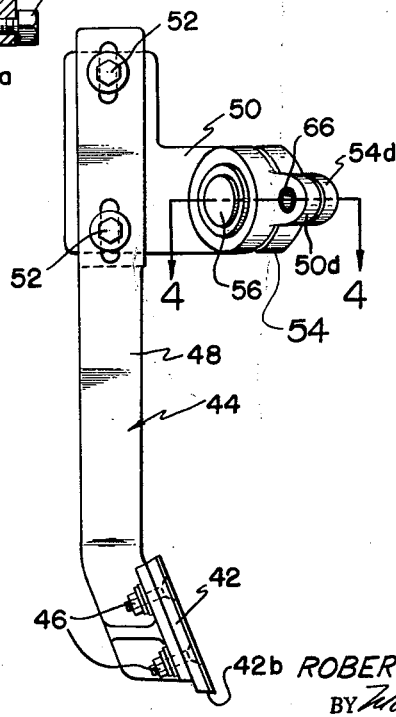
INVENTOR.
ROBERT L. McILVAINE
BY Mason, Kolehmainen,
Rathburn & Wyss.
ATTORNEYS

United States Patent Office 3,194,543
Patented July 13, 1965

3,194,543
MIXER
Robert L. McIlvaine, Winnetka, Ill., assignor to Herbert Simpson Corporation, Chicago, Ill., a corporation of Illinois
Filed Oct. 31, 1963, Ser. No. 320,471
7 Claims. (Cl. 259—107)

The present invention relates to mixers generally and more particularly to industrial mixers of the type used for pulverizing and mixing granular material such as foundry sand and the like.

In mixers of the type having a mixing chamber with a circular side wall and a bottom wall or wear plate and employing a rotary mixing head therein with one or more plows or scrapers thereon, it is desirable to have at least one of the scrapers positioned with an outer edge thereof to move in a path closely adjacent the outer circular wall in order to move material around the periphery of the chamber inwardly into the path of the muller wheels for grinding and pulverization. It is also desirable that the scraper have a lower edge moving closely adjacent to the bottom wall or wear plate in order to prevent a build up of material thereon and to provide thorough mixing of the material.

Because of the close clearances desired between the edges of the scraper and the circular side walls and bottom wall of the scrapers in order to accomplish thorough mixing, it is relatively easy for a foreign object such as a tool or piece of metal to become wedged between the edges of the scrapers and the chamber walls causing the rotation to slow or stall and damaging the walls, scraper and rotating head assembly.

Accordingly, the present invention has for a primary object the provision of a new and improved mixer of the type described wherein a scraper moving in close proximity to the bottom and circular side walls of the mixing chamber is supported by novel means so that should a foreign object become engaged between the walls and the scraper the scraper will move away from the walls to pass the object resulting in little or no damage to the parts of the mixer and no stalling or slowing of the rotary head.

More specifically, it is an object of the present invention to provide a new and improved scraper for a rotary mixer of the type described in which the scraper will automatically swing free of chamber walls whenever a force of predetermined magnitude opposes the rotation of the scraper.

Another object of the present invention is to provide a new and improved support means for supporting the scraper of a mixer of the type described in which frangible stop means are used to secure the scraper in a normal position in close proximity to the walls of the chamber so that the stop means are fractured allowing the scraper to move away from the walls whenever the force on the scraper exceeds a given magnitude.

These and other objects and advantages of the present invention are accomplished by the provision of a new and improved mixer having a mixing chamber with a circular side wall and a bottom wall with a mixing head assembly rotatable in the chamber about an axis normal to the bottom wall and centrally disposed in relation to the circular side wall. The head assemby includes a radially extending support arm which carries a scraper mechanism at its outer end. The scraper mechanism includes a scraper having a normal position wherein the outer edge thereof is closely adjacent the circular side wall and a lower edge thereof closely adjacent the bottom wall of the chamber. The scraper is carried at the lower end of a scraper support, the upper end of which is pivotally secured to the support arm about a pivotal axis extending in a direction such that the scraper can be pivotally moved from its normal position to a second position wherein the outer edge of the scraper moves inwardly away from the circular side wall and the lower edge of the scraper moves upwardly away from the bottom wall of the mixing chamber. Frangible stop means interconnecting the support arm and scraper support at a position spaced from the pivotal axis are provided for maintaining the scraper in its normal position by preventing rotation of the scraper support about the pivotal axis. When the scraper is subjected to a force of predetermined magnitude the stop means are fractured allowing the scraper to pivot about the pivotal axis so that the outer edge thereof moves inwardly away from the circular side wall and the lower edge of the scraper moves upwardly away from the bottom wall of the chamber to pass any obstruction or object which is engaged between the walls and the scraper.

In the embodiment of the invention as illustrated, the stop means takes the form of a shear pin which is designed to shear when a given force is applied to the scraper and scraper support. The shear pins can be of different sizes in order to shear at a variety of forces of desired magnitudes. When a shear pin has sheared and after the obstruction has been removed, a new shear pin is then inserted to again secure the scraper in its normal position and the mixer is then started up again.

For a better understanding of the invention, reference should be had to the following detailed description taken in conjunction with the drawings, in which:

FIG. 1 is a top plan view of a mixer constructed in accordance with the features of the present invention;

FIG. 2 is a sectional view taken substantially along the line 2—2 of FIG. 1;

FIG. 2a is a sectional view taken substantially along line 2a—2a of FIG. 2;

FIG. 3 is an enlarged side elevational view of a scraper mechanism of the mixer of FIG. 1 taken substantially along the line 3—3 of FIG. 2; and FIG. 4 is a sectional view taken substantially along line 4—4 of FIG. 3.

Referring now more particularly to the drawings, there is illustrated a mixer constructed in accordance with the features of the present invention and indicated generally by the reference numeral 10. The mixer 10 includes a cylindrical mixing chamber 12 having a circular side wall 14 forming the periphery thereof and a bottom wall or wear plate 16.

In order to mix and pulverize material placed in the mixing chamber 12, there is provided a rotary nulling and cross-head assembly 18 which rotates about a vertical axis 20 centrally disposed in the chamber with respect to the circular side wall 14. The cross-head assembly 18 rotates in the direction of the arrow 22 and includes a pair of mulling wheels 24 for grinding and pulverizing the material, which wheels are freely rotatable on and supported by mechanism indicated by the reference numeral 26.

The cross-head 18 also includes a pair of radially extending support arms 28 and 30 for carrying the various scrapers or plows of the mixer. The arm 28 extends in an opposite direction from the arm 30 and carries a scraper 32 by means of a support 34 bolted thereto. The scraper 32 is positioned with its lower edge 32a closely adjacent to the bottom wall 16 in order to prevent material from building up on the bottom wall and to provide for thorough mixing of the material. The scraper 32 is curved inwardly (FIG. 1) to direct material inwardly toward the center into the path of the mulling wheels 24 for pulverization. The scraper 32 has an outer leading edge 32b which is positioned inwardly from the circular wall 12 to provide a clearance "A" therebetween so that foreign objects of considerable size can pass between the scraper and the wall without wedging or jamming therebetween.

The support arm 30 carries another inner scraper 36 which is supported by a support 38 bolted thereto. The scraper 36 has a lower edge 36a in close proximity to the bottom wall 16 and is outwardly curved (FIG. 1) to move material from the center of the chamber outwardly into the path of the muller wheels 24.

In accordance with the present invention there is provided adjacent the outer end of the support arm 30 a scraper mechanism 40 including a scraper 42 carried at the lower end of a scraper support 44 and secured thereon by bolts 46. When the scraper 42 is in its normal position as shown in the drawings, its outer edge 42a is positioned closely adjacent the circular side wall 14 (FIG. 2) and its lower edge 42b is positioned closely adjacent the bottom wall or wear plate 16 of the mixing chamber. Thus, as the cross-head 18 rotates in the mixing chamber 12, the scraper 42 moves in a circular path closely adjacent the outer peripheral corner of the mixing chamber to prevent a building up of material in the corner and to provide for mixing of material which would otherwise remain in the corner because of the clearance "A" provided between the scraper 32 and circular wall 14.

The scraper support 44 includes a generally vertically extending member 48 which is slidably received in a vertical guideway defined in a supporting bracket 50. The member 48 is slotted to receive bolts 52 for adjustably securing the member to the bracket 50, thus permitting the scraper 42 to be adjusted up and down to obtain the desired clearance between the lower edge 42b and bottom wall 16.

The support bracket 50 is pivotally secured to a support member 54 by means of a pivot pin 56 having a central axis 58. The member 54 is provided with a mounting arm 54a which is secured to the support arm 30 by bolts 60 and set screws 62 (FIG. 2a). The mounting arm 54a is provided with slots 55 to accommodate the bolts 60 so that the member 54 can be secured at a plurality of different radially outward positions on the support arm 30 in order to provide the desired clearance between the edge 42a of the scraper and the circular side wall 14.

The member 54 and bracket 50 are provided with interfacing planar surfaces 54b and 50b, respectively, and the pin 56 is secured to the member 54 by means of a set screw 54c. The bracket 50 is held in place on the pin 56 by means of a collar 62 and bearings 64 are provided so that the bracket 50 can pivot freely on the pin 56. The member 54 and bracket 50 are provided with radially extending torque arms 54d and 50d, respectively, in which there are provided aligned passages 54e and 50e. The passages 54e and 50e are drilled normal to the surfaces 54b and 50b in order to receive a shear pin 66. The shear pin 66 is provided with bushings 68 and 70 and is held in place with set screws 72. The pin 66 is provided with an annular groove 66a which is positioned between the surfaces 54b and 50b so that when the pin shears it will shear at the groove 66a and the bracket 50 will then be free to pivot on the pivot pin 56. Also, the depth of the groove 66a can be varied in order that the pin 66 will shear when a given amount of shearing force is applied thereto.

From the foregoing description it can be seen that the scraper 42 is normally positioned with its outer edge 42a in close proximity to the circular side wall 14 and its lower edge 42b in close proximity to the bottom wall 16 so that material along the periphery of the mixing chamber 12 is continually mixed during rotation of the cross-head 18. Should a foreign object become engaged between the side wall 14 or bottom wall 16 and the scraper 42 during rotation of the scraper the excessive force caused thereby will tend to pivot the scraper support 44 around the axis 58 of the pivot pin 56. When the force on the scraper 42 reaches a predetermined level, the shear pin 66 is sheared along the groove 66a and the support 44 and scraper 42 can then freely pivot on the pivot pin 56 to an inward position away from the side and bottom wall of the mixing chamber 12. The axis 58 of the pivot pin 56 is preferably horizontal and intersects a radial plane 31 of the support arm 30 at an acute angle measured from the plane 31 in a direction opposite to the direction of cross-head rotation. This allows the support 44 to pivot in a direction so that the outer edge 42a of the scraper 42 can move inwardly away from the side wall 14 and the lower edge 42b thereof can move upwardly away from the bottom wall 16 in order to clear the foreign object before any damage is done to the mechanism. Of course, the size of the groove 66a of the shear pin 66 and the material of which the pin is constructed will determine the shear strength of the pin and consequently the magnitude of the force on the scraper 42 necessary to shear the pin.

The present invention thus provides a safety device for preventing damage to the mixer from foreign objects which may be encountered in the material being mixed while still insuring that material at the outer periphery of the mixing chamber is adequately and thoroughly mixed.

Although the present invention has been described with reference to a single illustrative embodiment thereof, it should be understood that numerous other modifications and embodiments can be devised by those skilled in the art that will fall within the spirit and scope of the principles of this invention.

What is claimed and desired to be secured by Letters Patent of the United States is:

1. A mixer comprising a mixing chamber having a bottom wall and a circular side wall, a cross-head in said chamber rotatable in one direction about a first axis normal to said bottom wall and centrally disposed in relation to said circular side wall, said cross-head including a support arm extending radially outward from said first axis, a scraper mechanism carried adjacent the outer end of said support arm, said mechanism including a scraper having a normal position with its outer edge closely adjacent said circular side wall and its lower edge closely adjacent said bottom wall, a scraper support carrying said scraper and pivotally secured adjacent the outer end of said support arm about a second axis, said second axis positioned to allow said scraper to pivotally move from its normal position to a second position wherein said outer edge is spaced inwardly away from said circular side wall and said lower edge is spaced upwardly away from said bottom wall and frangible stop means interconnecting said support arm and said scraper support at a position spaced from said second axis for maintaining said scraper in said normal position and frangible when said scraper is subjected to a force of predetermined magnitude in a direction opposed to the direction of rotation of said cross-head allowing said scraper to pivotally move to said second position.

2. Apparatus as defined in claim 1 wherein said second axis is horizontal and intersects a radial plane of said support arm at an acute angle measured from said plane in a direction opposite the direction of rotation of said cross-head.

3. Apparatus as defined in claim 1 wherein said frangible stop means includes a shear pin having one end secured in said support arm and the other end secured to said scraper support, said shear pin having a groove therein positioned to lie between said support arm and said scraper support.

4. Apparatus as defined in claim 3 wherein said support arm includes a first planar face normal to said second axis and said scraper support includes a second planar face parallel to and facing said first planar face, said shear pin being disposed normal to said faces and including an annular groove thereon positioned between said faces.

5. A mixer comprising a chamber having a bottom wall and a circular side wall, a cross-head rotatably mounted in said chamber to rotate about an axis normal to said bottom wall and centrally disposed in relation to said circular side wall, said cross-head including a support arm extending radially outward from the axis of rotation of said cross-head, a scraper mechanism carried by said support arm, said mechanism including a scraper having a first position wherein its outer edge moves in a path closely adjacent said circular side wall, a scraper support carrying said scraper and pivotally secured to said support arm about a second axis, said second axis positioned to allow said scraper to pivotally move from its first position to a second position wherein said outer edge is spaced inwardly away from said circular side wall and frangible stop means interconnecting said support arm and said scraper support for normally maintaining said scraper in said first position.

6. Apparatus as defined in claim 5 wherein said scraper is provided with a lower edge which is positioned to move in close proximity to said bottom wall when said scraper is in said first position and said lower edge is spaced upwardly away from said bottom wall when said scraper is in said second position.

7. Apparatus as defined in claim 5 wherein there are additionally included means for adjusting the clearance between the outer edge of said scraper and said side wall and the lower edge of said scraper and said bottom wall when said scraper is in said first position.

References Cited by the Examiner
UNITED STATES PATENTS

| | | | |
|---|---|---|---|
| 499,083 | 6/93 | Arnaud | 241—32 |
| 1,512,536 | 10/24 | Hibbins | 241—124 X |
| 2,677,533 | 5/54 | McMurray. | |
| 3,020,029 | 2/62 | Fejmert | 259—178 X |

CHARLES A. WILLMUTH, *Primary Examiner.*